Sept. 5, 1933.  E. F. WHITMORE  1,925,511
EGG PROCESSING MACHINE
Filed May 13, 1930   4 Sheets-Sheet 1
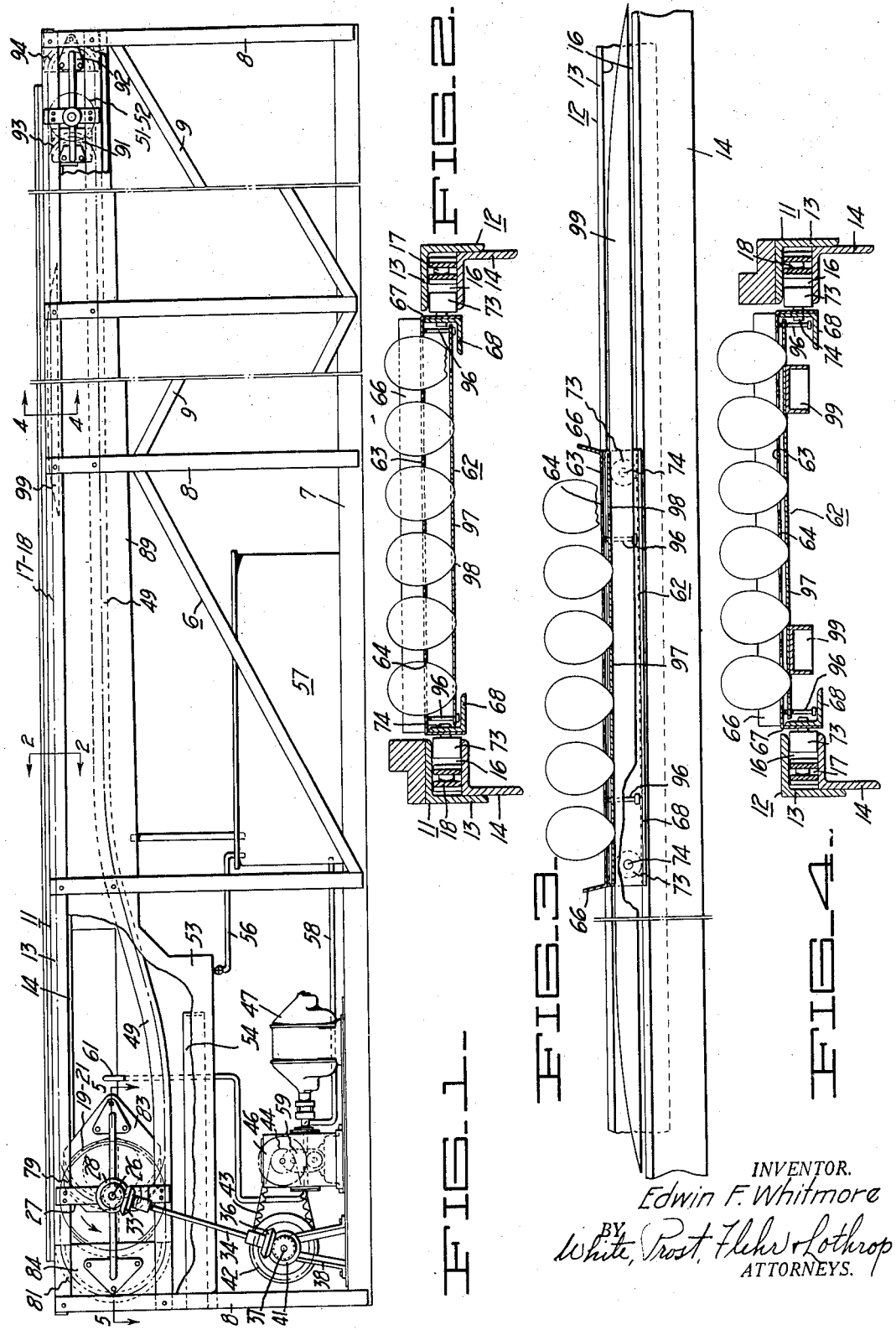
INVENTOR.
Edwin F. Whitmore
ATTORNEYS.

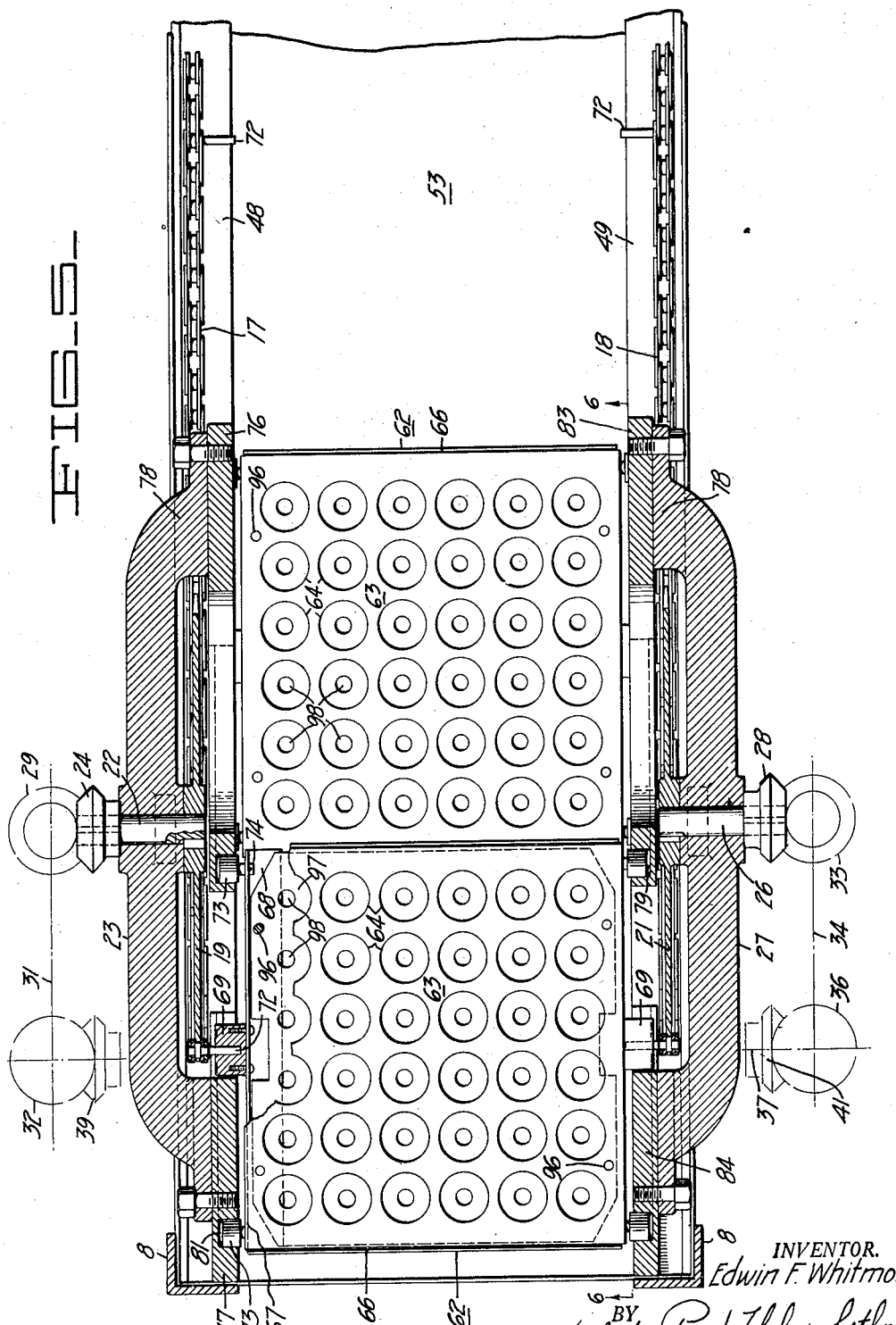

Sept. 5, 1933.     E. F. WHITMORE     1,925,511
EGG PROCESSING MACHINE
Filed May 13, 1930     4 Sheets-Sheet 3
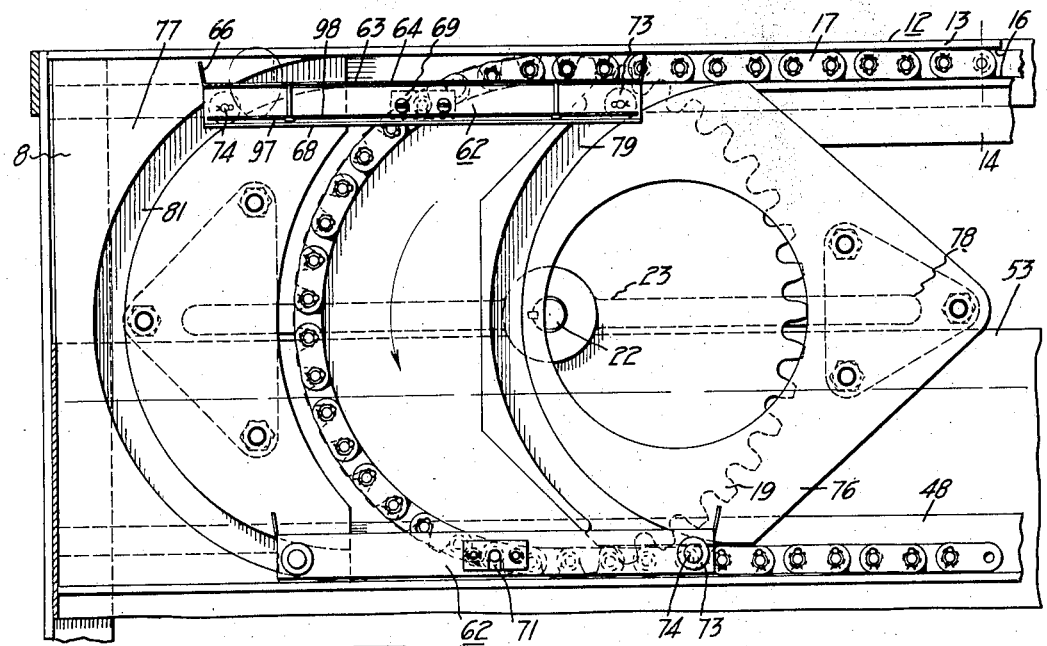
FIG_6_
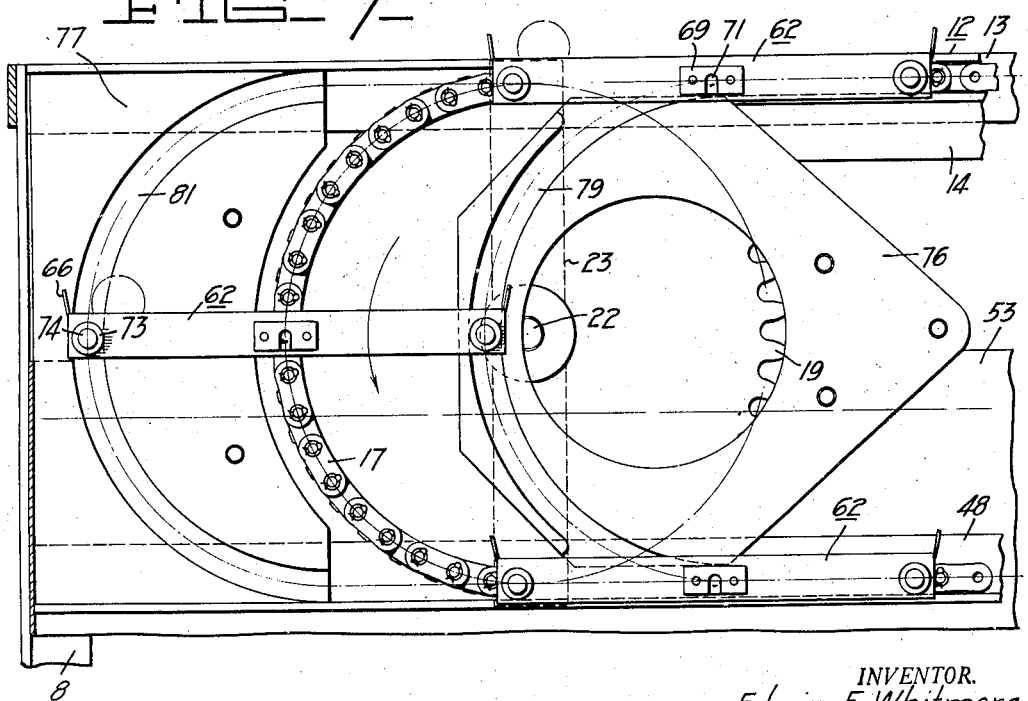
FIG_7_
INVENTOR.
Edwin F. Whitmore
BY White, Prost, Flehr & Lothrop
ATTORNEYS.

Sept. 5, 1933.   E. F. WHITMORE   1,925,511
EGG PROCESSING MACHINE
Filed May 13, 1930   4 Sheets-Sheet 4
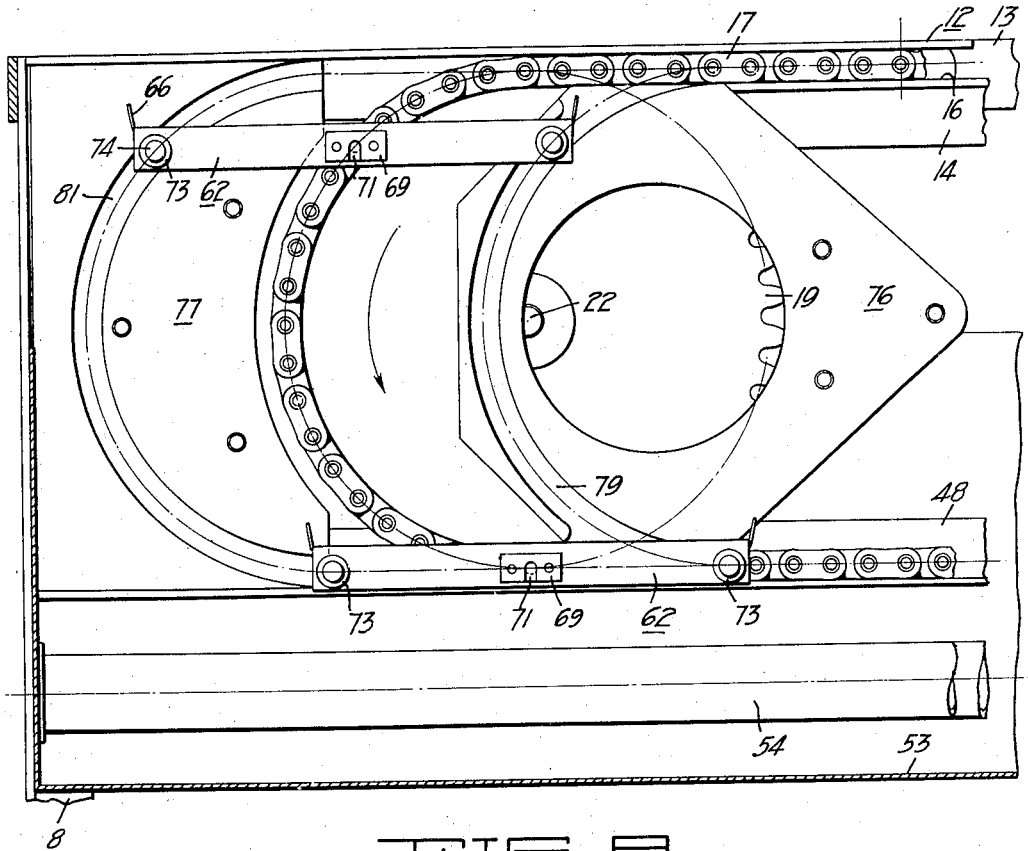
FIG_8_
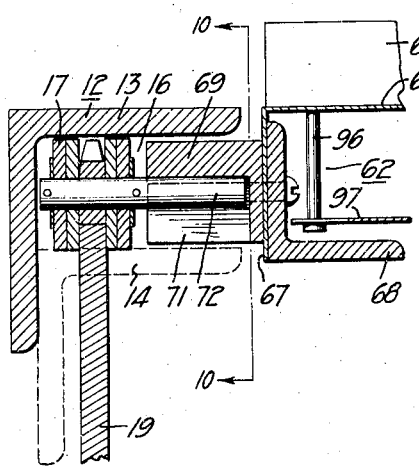
FIG_9_
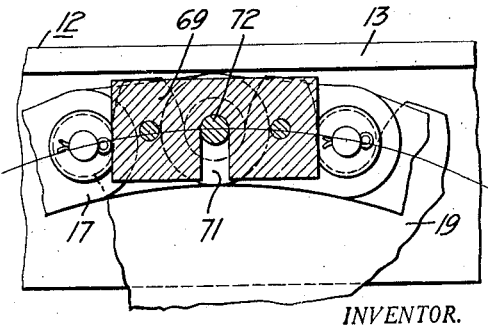
FIG_10_
INVENTOR.
Edwin F. Whitmore
BY White, Prost, Flehr & Lothrop
ATTORNEYS.

Patented Sept. 5, 1933

1,925,511

UNITED STATES PATENT OFFICE 1,925,511

EGG PROCESSING MACHINE

Edwin F. Whitmore, San Francisco, Calif.

Application May 13, 1930. Serial No. 451,946

1 Claim. (Cl. 99—2)

My invention relates to machines for handling large quantities of eggs to be processed, that is, to be coated or covered with a liquid coating such as oil. The processing of eggs in this fashion has been practised more or less successfully for a long time and numerous machines have been developed for the work. It is characteristic of all such machines which have come to my attention that they are provided with egg carriers which travel in a circuit. An operator initially positions the eggs in the machine to travel in the circuit and subsequently withdraws the processed eggs from the machine after they have completed a portion of the circuit. It occasionally occurs that the operator accidentally does not withdraw processed eggs from the machine. These eggs are destroyed upon subsequent operation of the machine. While such discrepancies are individually unimportant, when a large number of cases of eggs are handled during the day the aggregate loss is relatively great.

It is therefore an object of my invention to provide an egg processing machine in which eggs not withdrawn from the machine by an operator are not destroyed.

Another object of my invention is to provide an egg processing machine in which the eggs may travel throughout the circuit of the machine a plurality of times without damage.

Another object of my invention is to provide an egg processing machine which is simple in construction and capable of extended operation without substantial repairs.

The foregoing and other objects are attained in the embodiment of the invention shown in the drawings, in which Fig. 1 is a side elevation of an egg processing machine constructed in accordance with my invention, portions of the structure being broken away to disclose the mechanism.

Fig. 2 is a cross section on the line 2—2 of Fig. 1.

Fig. 3 is an enlarged cross section on a longitudinal vertical plane of a portion of the egg lifting mechanism.

Fig. 4 is a cross section on the line 4—4 of Fig. 1.

Fig. 5 is a cross section on the line 5—5 of Fig. 1.

Fig. 6 is a detailed view in cross section on a longitudinal vertical plane, indicated by line 6—6 of Fig. 5, showing one position of an egg carrier.

Fig. 7 is a view similar to Fig. 6 showing another position of the egg carrier.

Fig. 8 is a view similar to Figs. 6 and 7 showing the egg carrier in farther advanced position.

Fig. 9 is a transverse cross section on a vertical plane disclosing the attachment of an egg carrier to one of the conveyor chains.

Fig. 10 is a cross section on the line 10—10 of Fig. 9.

In its preferred form, the egg processing machine of my invention comprises a conveyor adapted to operate in a predetermined path and is provided with egg carriers mounted on the conveyor and designed to operate in a different path so that the eggs are maintained substantially in a predetermined position throughout the path of the conveyor.

In the form of my invention disclosed in the drawings, I provide a framework 6 made up of the usual structural shapes such as channels and angles. The framework 6 preferably includes a base 7 on which uprights 8 and braces 9 are connected. The uprights carry at their upper extremities a pair of opposed longitudinally extending rails 11 and 12 each made of a pair of nested angles 13 and 14. The rails 11 and 12 extend for substantially the entire length of the framework 6 and provide channels for the upper runs of conveyor chains 17 and 18. The chains throughout their upper runs are substantially horizontal and are parallel, but adjacent one end of the conveyor they engage a pair of sprockets 19 and 21 which are of relatively large diameter. The sprocket 19 is carried on a shaft 22 which is journalled in a spider 23 fastened to the framework 6 and which is provided at its extremity with a bevel gear 24. Correspondingly, the sprocket 21 is fixedly mounted on a shaft 26 journalled in a spider 27 fastened to the framework 6 and carrying a bevel gear 28 at its extremity.

In order to drive the two sprockets 19 and 21 in synchronism I rotate the two bevel gears 24 and 28 in proper phase relationship. Meshing with the gear 24 is a bevel gear 29 located at the upper extremity of a shaft 31 journalled on the framework 6 and at its lower extremity carrying a bevel gear 32. In a similar fashion the bevel gear 28 is in mesh with a bevel gear 33 at the upper end of a shaft 34 journalled in the framework 6 and also carrying a bevel gear 36. Mounted on a cross shaft 37 carried in journals 38 on the base 7 are bevel pinions 39 and 41 which mesh with the gears 32 and 36, respectively. To drive the shaft 37 there is provided a sprocket 42 linked by a chain 43 to a sprocket 44 on a reduction gear 46 of the usual kind. A motor 47 operates the reduction gear to drive the two sprockets 19 and 21 in synchronism and advance their respective conveyor chains 17 and 18 along the upper run of the conveyor path.

After their engagement with the sprockets 19 and 21, the chains 17 and 18 are confined in their lower run by rails 48 and 49 suitably mounted on the uprights 8. The rails 48 and 49 have approximately the path or contour disclosed in Fig. 1 and at the opposite extremity of the framework 6 direct the chains 17 and 18 to pass about a pair of sprockets 51 and 52 for restoring the chains to the upper run.

Adjacent the sprockets 19 and 21 and surrounding the depressed portion of the lower run of the conveyor chains I provide a tank 53 for containing the liquid with which the eggs are to be treated. This tank is preferably supported in the framework 6 and is usually provided with heating elements 54 for maintaining the desired temperature of the contents. In order to establish the level of liquid in the tank 53 at the desired height I provide an overflow conduit 56 which returns surplus liquid to a sump tank 57 likewise mounted on the framework 6. To restore liquid from the sump 57 to the tank 53 a return conduit 58 is provided and is in circuit with a pump 59 driven preferably by the motor 47 and discharging through a pipe 61 to the tank 53.

I preferably provide the conveyor chains 17 and 18 with a plurality of egg carriers generally designated 62. Each of the carriers is substantially identical with the remaining carriers and includes a top plate 63 usually fabricated of metal and pierced with a plurality of geometrically arranged apertures 64 of suitable size to receive but not pass the customary eggs. The plate 63 at its sides is preferably upturned or flanged as at 66 to prevent accidental escape of eggs therefrom and at the sides is downturned or flanged as at 67 to overlie an angular frame 68. Connected to the frame 68 at each side of the carrier 62 and removably joined to the chains 17 and 18 are blocks 69, particularly disclosed in Figs. 9 and 10. Each of the blocks 69 is provided with an open slot 71 adapted to overlie a pivot pin 72 projecting from the chains 17 and 18. Since the pins 72 on the two chains 17 and 18 are in transverse alignment, the blocks 69 afford pivotal mountings for the carriers. Ordinarily the blocks 69 are confined in the channel 16 formed by the angles 13 and 14 but at suitable locations the angles 13 are interrupted to permit the blocks and their accompanying carriers to be lifted and thereby disengaged from the chains 17 and 18.

Since the blocks 69 run in the same channels in which the chains 17 and 18 run, the carriers throughout a large portion of the circuit of the conveyors travel in the same path therewith and in order further to constrain the carriers I provide each of them adjacent each corner with rollers 73 journalled on pins 74 secured to the frame 68 and adapted to run in the channels 16. In this fashion I ensure that substantially throughout the entire length of the upper run of the conveyor the carriers are carried in an approximately horizontal position coinciding very closely with the path of advance of the conveyors.

In order to prevent any possibility of eggs being discharged from the carriers as the carriers round the sprockets 19 and 21 I preferably maintain the carriers in their substantially horizontal or upright position despite the fact that the conveyors invert in passing around the sprockets. It is therefore necessary to move the carriers pivotally with respect to the chains 17 and 18 and to accomplish this purpose I provide adjacent each of the sprockets 19 and 21 suitable guide plates 76 and 77. The guide plate 76 is mounted on a rearward extension 78 of the spider 23 and is provided with an arcuate groove 79 adapted at one extremity to merge with the channel 16 and at the other extremity to merge with the channel defined by the rail 48.

In a similar fashion the guide plate 77 is provided with an arcuate groove 81 at one extremity continuing the channel 16 and at the other extremity giving onto the channel marked by the rail 48. The distance between the center lines of the grooves 79 and 81 is equal to the center line distance of the rollers 73 on each of the egg carriers. Since the carriers are pivoted by the blocks 69 to the chains 17 and 18 and since comparable guide plates 83 and 84 are provided at the opposite side of the framework to cooperate with the chain 18 the egg carriers in rounding the sprockets 19 and 21 are maintained in their upright position by virtue of the fact that the rollers 73 are constrained by the pairs of grooves 79 and 81. There is no inversion of the egg carriers and it is therefore impossible for any of the eggs carried thereby to be dislodged or lost from the machine.

The eggs immediately upon rounding the sprockets 19 and 21 are immersed, together with their associated carriers, in the liquid contained in the tank 53 and are thereby processed. Upon further advancing movement of the conveyor in its lower run the eggs are lifted from the liquid in the tank by virtue of the fact that the carriers are inclined slightly to their usual horizontal position, as indicated in Fig. 1. Despite the inclination of the carriers at this point in their path of advance I characterize the position of the carriers as substantially horizontal inasmuch as they deviate therefrom only to a small degree and in any event not sufficiently to permit the gravital discharge of the carried eggs therefrom.

Upon further advancing movement of the conveyor the eggs are propelled throughout the lower run of the conveyor, surplus liquid acquired in tank 53 meanwhile dripping therefrom. I provide on the framework 6 an inclined trough 89 which returns surplus liquid to the tank 53. Upon approaching the far end of the framework 6, the egg carriers again encounter guide plates 91 and 92 located at each side of the framework. These guides are provided with grooves 93 and 94 so that upon rounding the sprockets 51 and 52 the generally horizontal or upright position of the carriers is maintained and the processed eggs pass the sprockets to the upper run of the conveyor without danger of inversion or loss.

In order to permit lifting of the eggs from the carrier as they return on the upper run of the conveyor I preferably provide means for projecting the eggs from their former position nested within the apertures 64. To this end each carrier 62 is provided with a plurality of depending posts 96 acting as guides for a lower plate 97 usually fabricated of metal and provided with a plurality of apertures 98 in alignment with the apertures 64 but of considerably smaller size. Mounted on the framework 6 is a plurality of cam bars 99 disposed in the path of the lower plate 97 and adapted, as the conveyor advances the carriers thereover, to move the plates 97 toward the plates 63 so that the eggs are lifted from their former position and are readily engageable by the operator's fork customarily used. Upon additional advancing movement of the conveyor in its upper run, the lower plates 97 ride over and beyond the cam bars 99 and drop gravitally on the posts 96 to their former position in order to receive an additional lot of eggs.

By the provision of a machine as described I am able in adjacent locations to withdraw processed eggs from the machine and to place unprocessed eggs thereon. Despite the fact that the eggs are carried in a closed circuit they are never displaced from a substantially horizontal or upright position so that even if the operator of the machine should fail to withdraw processed eggs from the carrier, such eggs will simply continue to move throughout the circuit either once or a plurality of times without any danger of being discharged as the carriers round the sprockets at either end of the conveyor. This manner of operating is advantageous in the usual single circuit processing of eggs in that there are substantially no losses from discharge or breakage of the eggs but the system is further advantageous in instances wherein it is desired to process the eggs by a plurality of circuits of the conveyor through the liquid tank or through any other suitable processing devices.

It is to be understood that I do not limit myself to the form of the egg processing machine shown and described herein, as the invention, as set forth in the following claim may be embodied in a plurality of forms.

I claim:

An egg processing machine comprising an open topped, liquid retaining housing having a pair of parallel, substantially vertical sides, a pair of sprockets within said housing at one end thereof, said sprockets being coaxial and being disposed each adjacent one of said sides, a second pair of sprockets within said housing at the other end thereof, said second sprockets being coaxial and being disposed each adjacent one of said sides, means in connection with each of said sides providing a closed channel at each end substantially coinciding with at least half the periphery of the adjacent one of said sprockets, there being in each of said sides adjacent each end thereof a pair of arcuate grooves merging with said channel and having the same radius of curvature as the adjacent sprocket, a chain operating in each of said channels and over the associated sprockets, egg carriers pivotally mounted on said chains, and means on each of said carriers and adapted to run in said channels and said grooves for maintaining said carriers in substantially horizontal position.

EDWIN F. WHITMORE.